March 12, 1957     W. DENNON     2,784,949
APPARATUS AND METHOD FOR DISSOLVING POWDERED FOOD
Filed May 3, 1954
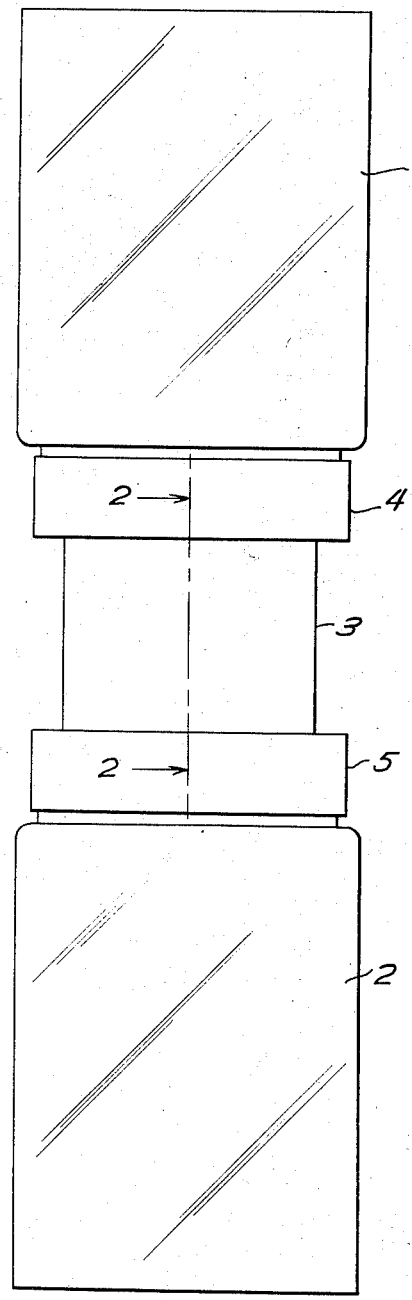
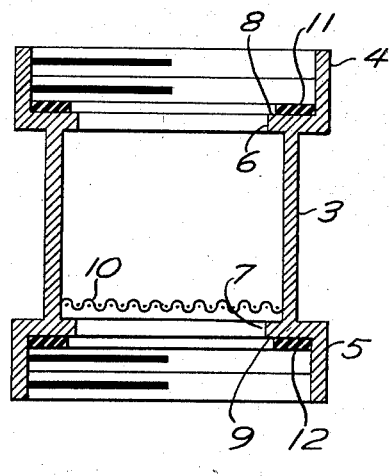
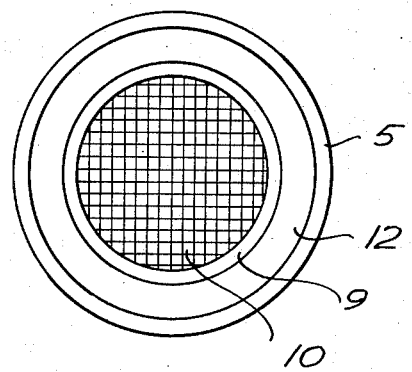
INVENTOR.
WILLIAM DENNON
BY
John W. Ralls
HIS ATTORNEY United States Patent Office 2,784,949
Patented Mar. 12, 1957

2,784,949
APPARATUS AND METHOD FOR DISSOLVING POWDERED FOOD

William Dennon, Decatur, Ga.

Application May 3, 1954, Serial No. 427,293

3 Claims. (Cl. 259—72)

This invention relates to improved apparatus and method for dissolving powdered food products in liquid. It is especially useful in mixing powdered milk, baby formula, and the like.

Powdered food products, such as powdered milk and baby formula, are produced by modern methods in the form of a fine and uniform dry powder which readily dissolves in water if the grains of powder can be prevented from agglomerating into lumps. The very fineness and uniformity of the powder, however, tends to promote such agglomeration, since the grains tend to pack together, especially when the powder is pressed down or tamped for the purpose of accurately measuring out a desired quantity. If the measured amount of powder is dropped directly into the liquid, lumps may be formed in which the outer grains of powder become wet and adhere to one another, which prevents the liquid from reaching the inner grains and greatly impedes the dissolving of the powder.

I have found that this difficulty can be avoided, and that the powder can be dissolved very quickly and easily, if first the dry powder is sifted onto the surface of the liquid through a dry screen, and then the liquid is passed back and forth through the screen a few times. The first step of sifting the powder through the screen breaks up any large lumps which may have been formed in the dry powder by the grains packing together; the subsequent step of passing the liquid back and forth through the screen thoroughly mixes the powder with the liquid and at the same time breaks apart any small lumps of powder which may have formed in the liquid.

In my preferred apparatus for dissolving powdered food products, two standard food jars can be removably attached to respective ends of a hollow cylindrical metal member having a wire screen extending transversely across its interior. With the cylindrical member attached to one jar only, the powder is sifted through the screen onto the surface of the liquid. The other jar is then attached, and the assembly is inverted several times, or is shaken, to cause the liquid to pass back and forth through the screen.

My invention will be better understood from the following description taken in connection with the accompanying drawing, and its scope will be pointed out in the appended claims. In the drawing, Fig. 1 is a front elevation of my apparatus for dissolving powdered food, showing the two jars attached to the cylindrical member, Fig. 2 is a section view of the cylindrical member, taken along the line 2—2 of Fig. 1, and Fig. 3 is a bottom end view of the cylindrical member.

Referring to the drawing, jars 1 and 2 preferably are standard one-quart glass food jars each having an externally threaded mouth suitable for closure by a conventional screw cap when it is desired to use the jars for food storage. A hollow cylindrical metal member 3, open at both ends, has internally threaded end portions 4 and 5 which match with the threaded mouths of jars 1 and 2 so that the jars can be removably attached to respective ends of the cylindrical member. Two annular flanges 6 and 7 are attached to and extend inward from the interior surface of the cylindrical member 3 respectively adjacent to and inside of its threaded end portions 4 and 5, as shown. The center portion of cylindrical member 3, between and connecting end portions 4 and 5, is substantially two and one-quarter inches in interior diameter and one and one-half inches in length. The threaded end portions are slightly larger in interior diameter than the center portion, as shown. This difference in interior diameters, together with the flanges 6 and 7, forms two annular shoulders 8 and 9 respectively adjacent to and extending inward from the threaded end portions.

A circular wire screen 10, having a mesh size of substantially sixteen to the inch, extends transversely across the interior of member 3 adjacent to the lower flange 7. The periphery of screen 10 is permanently attached to the interior surface of member 3 by suitable means, such as soldering. Two annular rubber washers 11 and 12 fit inside of end portions 4 and 5 and abut on shoulders 8 and 9, respectively. When jars 1 and 2 are attached to cylindrical member 3, washers 11 and 12 also abut on the respective mouths of jars 1 and 2 to prevent leaks between the jars and the cylindrical member.

To dissolve a powdered food product, start with both jars disassembled from member 3, and with the interior of member 3, particularly screen 10, dry. Place the liquid in jar 2, and screw cylindrical member 3 onto the mouth of jar 2, with screen 10 at the lower end of the cylinder. Measure the powder into the center portion of member 3, and sift the powder through screen 10 onto the surface of the liquid. If necessary, the cylindrical member may be tapped or shaken, or the powder may be stirred lightly, to assist the sifting of the powder through the screen. Then invert jar 1 and screw its mouth onto the top of member 3. This forms a rigid assembly, with the mouths of the two jars connected by the cylindrical member. Invert the assembly a few times, or shake it, to cause the liquid to pass back and forth through screen 10. The powder will quickly dissolve in the liquid. The apparatus may now be disassembled, with the dissolved food product in whichever jar is now on the bottom, either jar 1 or jar 2, as desired. The food may be used immediately, or the mouth of the jar may be closed by a conventional screw cap to store the food.

An added advantage of this apparatus is the ease with which it can be cleaned and sterilized. It is easily disassembled, and all of the parts may be placed in boiling water. This is especially important in hospitals and the like, where large quantities of baby food must be prepared, and whre there is danger of disease spreading from one baby to another. The standard food jars are usually readily available in adequate quantities, and a quantity of the cylindrical members can be manufactured at low cost. Consequently, it is economically feasible to provide in such places a sufficient quantity of mixing apparatus that there will be no occasion to reuse the same mixer without first sterilizing it.

It should be appreciated that my invention is not limited to the specific embodiment herein illustrated and described, and that the following claims are intended to cover all changes and modifications which do not depart from the true spirit and scope of the invention.

I claim:

1. Apparatus for dissolving powdered food, comprising a hollow cylindrical member open at both ends, each end of said member having interior threads suitable for attachment to the threaded mouth of a food jar, two annular flanges attached to and extending inward from the interior surface of said member respectively adjacent to and inside of its threaded ends, said flanges being spaced apart and connected by an elongated hollow cylindrical center portion of said cylindrical member, and a wire screen extending transversely across the interior of said member adjacent to one of said flanges, whereby powdered food can be placed within said center portion and sifted through said screen.

2. Apparatus comprising a hollow cylindrical member open at both ends, each end portion of said member having interior threads, the interior surfaces of said member having two annular shoulders respectively adjacent to and extending inward from said threaded end portions, said shoulders being spaced apart and connected by an elongated hollow center portion of said cylindrical member, and a screen extending transversely across the interior of said member at one end of said center portion.

3. Apparatus for dissolving powdered food, comprising two standard one-quart glass food jars each having an exteriorly threaded mouth, a hollow cylindrical metal member open at both ends and having two interiorly threaded end portions, the threads of said end portions matching with the threads of said jars for removably attaching said jars to respective ends of said cylindrical member, the interior surface of said member having two annular shoulders respectively adjacent to and extending inward from said threaded end portions, said member having a center portion substantially one and one-half inches in length between said shoulders, a circular wire screen extending transversely across the interior of said member at one end of said center portion, and two annular rubber washers respectively fitting inside of said end portions and abutting on said shoulders, said washers also abutting on the respective mouths of said jars when the jars are attached to said member.

References Cited in the file of this patent
UNITED STATES PATENTS

| | | |
|---|---|---|
| 807,522 | Warner | Dec. 19, 1905 |
| 886,075 | Remington | Apr. 28, 1908 |
| 1,637,103 | Corwin | July 26, 1927 |
| 1,910,900 | Johnson | May 23, 1933 |

FOREIGN PATENTS

| | | |
|---|---|---|
| 635,166 | Great Britain | Apr. 5, 1950 |